US008543838B1

(12) United States Patent
Au et al.

(10) Patent No.: US 8,543,838 B1
(45) Date of Patent: Sep. 24, 2013

(54) CRYPTOGRAPHIC MODULE WITH SECURE PROCESSOR

(75) Inventors: Siu-Hung Fred Au, Fremont, CA (US); Gregory Burd, San Jose, CA (US); Wayne C. Datwyler, Mission Viejo, CA (US); Leonard J. Galasso, Trabuco Canyon, CA (US); Tze Lei Poo, Sunnyvale, CA (US); Minda Zhang, Westford, MA (US)

(73) Assignee: Marvell International Ltd., Hamilton (BM)

( * ) Notice: Subject to any disclaimer, the term of this patent is extended or adjusted under 35 U.S.C. 154(b) by 272 days.

(21) Appl. No.: 12/944,025

(22) Filed: Nov. 11, 2010

Related U.S. Application Data

(60) Provisional application No. 61/289,884, filed on Dec. 23, 2009.

(51) Int. Cl.
*G06F 12/14* (2006.01)

(52) U.S. Cl.
USPC .......... 713/190

(58) Field of Classification Search
USPC .......... 713/190, 150, 168
See application file for complete search history.

(56) References Cited

U.S. PATENT DOCUMENTS

| | | | | |
|---|---|---|---|---|
| 2006/0031685 | A1 * | 2/2006 | Chen et al. | 713/190 |
| 2006/0288235 | A1 * | 12/2006 | Goto | 713/190 |
| 2007/0198851 | A1 * | 8/2007 | Goto | 713/187 |
| 2009/0276626 | A1 * | 11/2009 | Lazaridis et al. | 713/168 |
| 2010/0241855 | A1 * | 9/2010 | Chou et al. | 713/168 |
| 2012/0210130 | A1 * | 8/2012 | Buer et al. | 713/168 |

* cited by examiner

*Primary Examiner* — Dustin Nguyen
*Assistant Examiner* — Hao Nguyen

(57) ABSTRACT

Cryptographic apparatus having corresponding methods and computer-readable media comprise: a mailbox memory module to store cryptographic commands received from a client over a client bus, wherein the client is external to the cryptographic apparatus; and a secure processor to obtain the cryptographic commands from the mailbox memory module over a first secure internal bus, execute the cryptographic commands, and store a status of execution of the cryptographic commands in the mailbox memory module over the first secure internal bus, wherein the client obtains the status of the cryptographic commands from the mailbox memory module over the client bus.

20 Claims, 3 Drawing Sheets

100
Channel 104
Cryptographic Device 102
SoC 106
External Memory 112
Client 110
114
Output Text 146
Input Text 138
Status 144
Cryptographic Commands 140
DMA Module 122
Mailbox Memory 118
130
Secure Processor 116
Output Text 146
Input Text 138
132
Cryptographic Commands 140
Status 144
Primitive Instructions 142
Processor Memory 134
Status 144
Cryptographic Engine 120
Key(s) 128
OTP Memory 126
Scratch-pad Memory 136
TSR 124
Cryptographic Module 108

CRYPTOGRAPHIC MODULE WITH SECURE PROCESSOR

CROSS-REFERENCE TO RELATED APPLICATIONS

This disclosure claims the benefit of U.S. Provisional Patent Application Ser. No. 61/289,884, entitled "Base Crypto Module FW Architecture," filed on Dec. 23, 2009, the disclosure thereof incorporated by reference herein in its entirety.

FIELD

The present disclosure relates generally to cryptography. More particularly, the present disclosure relates to a cryptographic module with a secure processor.

BACKGROUND

Cryptography has enjoyed tremendous success in securing electronic data communications. Recently, cryptography has been used to secure stored data as well. For example, secure hard drives, referred to as "self-encrypting drives," are now commercially available. Such drives include a cryptographic module to encrypt data using a cryptographic key before it is stored on the drive, and to decrypt the data using the key on retrieval. If a computer or drive is stolen, the thief cannot access the data stored on the drive without the cryptographic key.

However, current self-encrypting drives have several flaws that compromise their security. For example, the cryptographic key, which is stored in the drive, can be obtained by a skilled hacker, allowing the hacker to access the data on the drive. As another example, a hacker can cause the drive to download and execute malware, which can provide access to the stored data.

SUMMARY

In general, in one aspect, an embodiment features a cryptographic apparatus comprising: a mailbox memory module to store cryptographic commands received from a client over a client bus, wherein the client is external to the cryptographic apparatus; and a secure processor to obtain the cryptographic commands from the mailbox memory module over a first secure internal bus, execute the cryptographic commands, and store a status of execution of the cryptographic commands in the mailbox memory module over the first secure internal bus, wherein the client obtains the status of the cryptographic commands from the mailbox memory module over the client bus.

In general, in one aspect, an embodiment features computer-readable media embodying instructions executable by a processor to perform a method comprising: obtaining cryptographic commands from a mailbox memory module over a first secure internal bus, wherein the cryptographic commands are stored in the mailbox memory module over a client bus by a client; executing the cryptographic commands; and storing a status of execution of the cryptographic commands in the mailbox memory module over the first secure internal bus, wherein the client obtains the status of the cryptographic commands from the mailbox memory module over the client bus.

In general, in one aspect, an embodiment features a method comprising: obtaining cryptographic commands from a mailbox memory module over a first secure internal bus, wherein the cryptographic commands are stored in the mailbox memory module over a client bus by a client; executing the cryptographic commands; and storing a status of execution of the cryptographic commands in the mailbox memory module over the first secure internal bus, wherein the client obtains the status of the cryptographic commands from the mailbox memory module over the client bus.

The details of one or more implementations are set forth in the accompanying drawings and the description below. Other features will be apparent from the description and drawings, and from the claims.

Figure 1:
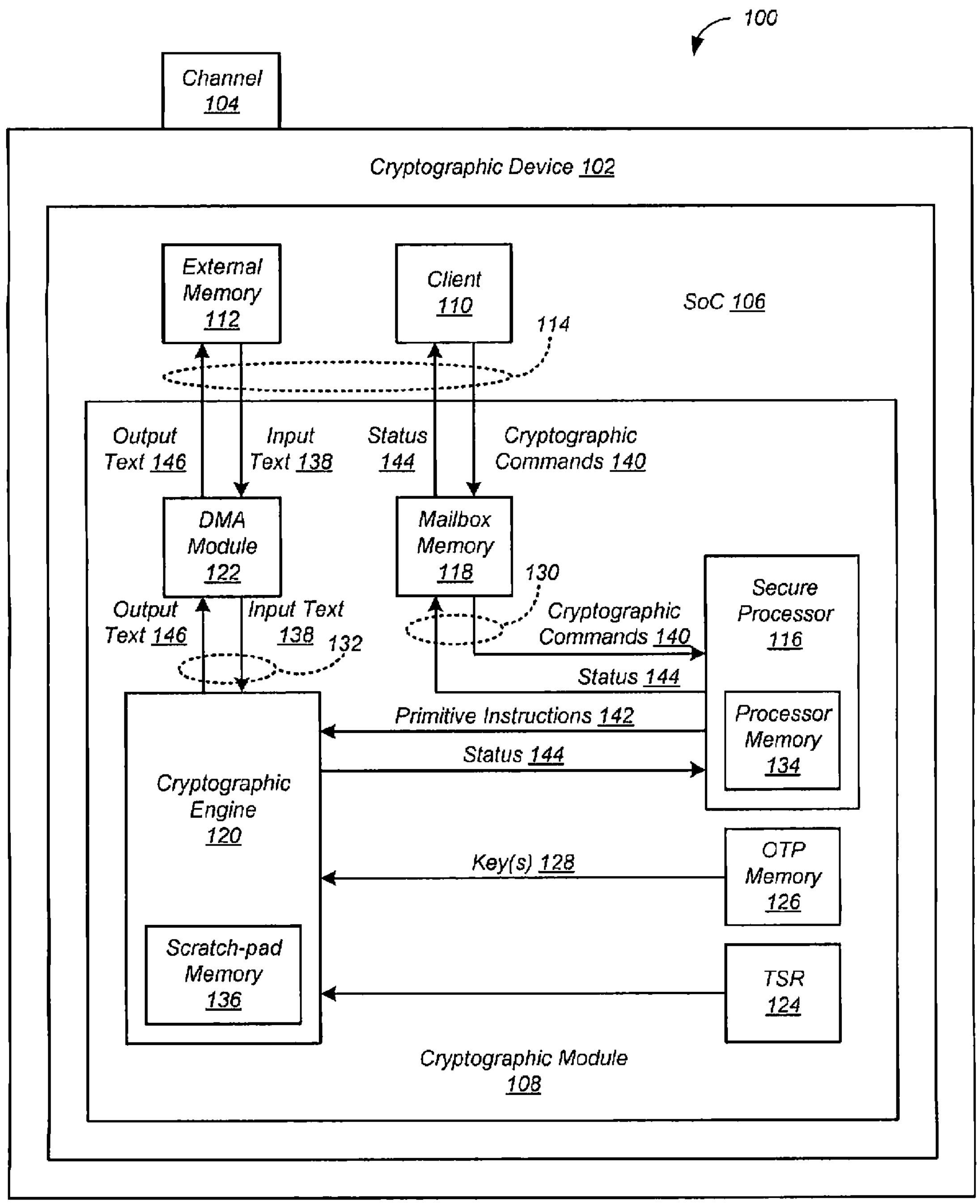
FIG. 1 shows elements of a cryptographic system according to one embodiment.

The leading digit(s) of each reference numeral used in this specification indicates the number of the drawing in which the reference numeral first appears.

DETAILED DESCRIPTION

Embodiments of the present disclosure provide elements of a cryptographic module with a secure processor. The cryptographic module includes elements that isolate the secure processor within the cryptographic module. For example, when incorporated in a self-encrypting hard drive, the secure processor is isolated from the drive firmware and host processor, thereby isolating cryptographic functions from the servo functions of the drive. Embodiments also include a secure memory that cannot be accessed by the host processor or host operating system. Therefore cryptographic keys and other data stored in the secure memory cannot be accessed from outside the cryptographic module.

FIG. 1 shows elements of a cryptographic system 100 according to one embodiment. Although in the described embodiments the elements of cryptographic system 100 are presented in one arrangement, other embodiments may feature other arrangements. For example, elements of cryptographic system 100 can be implemented in hardware, software, or combinations thereof. In some embodiments, cryptographic module 108 is compliant with the 140 series of Federal Information Processing Standards (FIPS), including at least one of FIPS 140-2 and FIPS 140-3.

Referring to FIG. 1, cryptographic system 100 includes a cryptographic device 102 in communication with a channel 104. Channel 104 can be implemented as a storage device, a communications channel, or the like. For example, cryptographic system 100 can be implemented as a self-encrypting drive, and channel 104 can be implemented as a hard drive. As another example, cryptographic system 100 can be implemented as a mobile phone or set-top box, and channel 104 can be implemented as a wireless or wired communications channel.

Cryptographic device 102 includes a system-on-chip (SoC) 106 that includes a cryptographic module 108 in communication with a client 110 and an external memory 112 over a client bus 114. Cryptographic module 108 includes a secure processor 116, a mailbox memory 118, a cryptographic engine 120, a direct memory access (DMA) module 122, a trust status register (TSR) 124, and a one-time-programmable (OTP) memory 126 to store one or more cryptographic keys 128. OTP memory 126 can also store system secrets as well as system lifecycle parameters that need to persist across power cycles. The contents of OTP memory 126 can be made to be accessible to, and modifiable by, only secure processor 116. Cryptographic module 108 also includes a secure processor bus 130 for secure communication between secure processor 116 and mailbox memory 118, and a secure memory bus 132 for secure communication between cryptographic engine 120 and DMA module 122. Secure processor 116 includes a processor memory 134 to store processor instructions and data. Cryptographic engine 120 includes a scratch-pad memory 136 for storage of intermediate variables and the like.

Mailbox memory 118 is used to isolate secure processor 116 from external elements such as client 110. Client 110 and secure processor 116 do not communicate directly. Client 110 stores cryptographic commands 140 in mailbox memory 118 over client bus 114. Secure processor 116 obtains cryptographic commands 140 from mailbox memory 118 over secure processor bus 130. Secure processor 116 stores status 144 of cryptographic commands 140 in mailbox memory 118 over secure processor bus 130. Client 110 obtains status 144 from mailbox memory 118 over client bus 114.

In addition to a secure processor 116, cryptographic module 108 also includes secure memory that is not accessible from outside cryptographic module 108. This secure memory includes OTP memory 126, processor memory 134, and scratch-pad memory 136.

DMA module 122 exchanges input text 138 and output text 146 with external memory over client bus 114, and exchanges text 138 and 146 with cryptographic engine 120 over secure memory bus 132, in accordance with cryptographic commands 140 received from client 110. As used herein, the term "text" refers to plaintext and/or ciphertext. In some applications the text can include cryptographic keys. The keys can be stored in non-volatile memory inside or outside of cryptographic device 102, in wrapped form. Wrapped keys are keys that are themselves encrypted by another key at a higher hierarchical level in the security architecture. With the capability to import and export keys into and out of cryptographic module 108, the system can operate with a much larger set of keys than that allowed by the size of OTP memory 126.

Cryptographic engine 120 encrypts the plaintext, and decrypts the ciphertext, in accordance with cryptographic commands 140 and cryptographic keys 128, which can include symmetric and asymmetric keys. Cryptographic commands 140 include primitive instructions 142. Cryptographic engine 120 executes primitive instructions 142 conditionally in accordance with contents of trust status register 124. For example, the primitive instructions can have an in-built tag within the command itself. An embodiment of this tag can be a 32-bit value (or longer) that is pre-configured to reflect the operational conditions under which the instruction is allowable. Before executing a primitive instruction, secure processor 116 checks this in-built tag against trust status register 124 to ensure that the primitive instruction is allowable under the current security configuration or state.

In some embodiments, cryptographic module 108 includes a random bits generation engine. Together with the firmware program run by secure processor 116, random numbers can be generated that are suitable for use as keys for various cryptographic purposes including data encryption, digital signature, and the like. Also dependent on the secure processor program, these random number numbers can be FIPS compliant.

Figure 2:
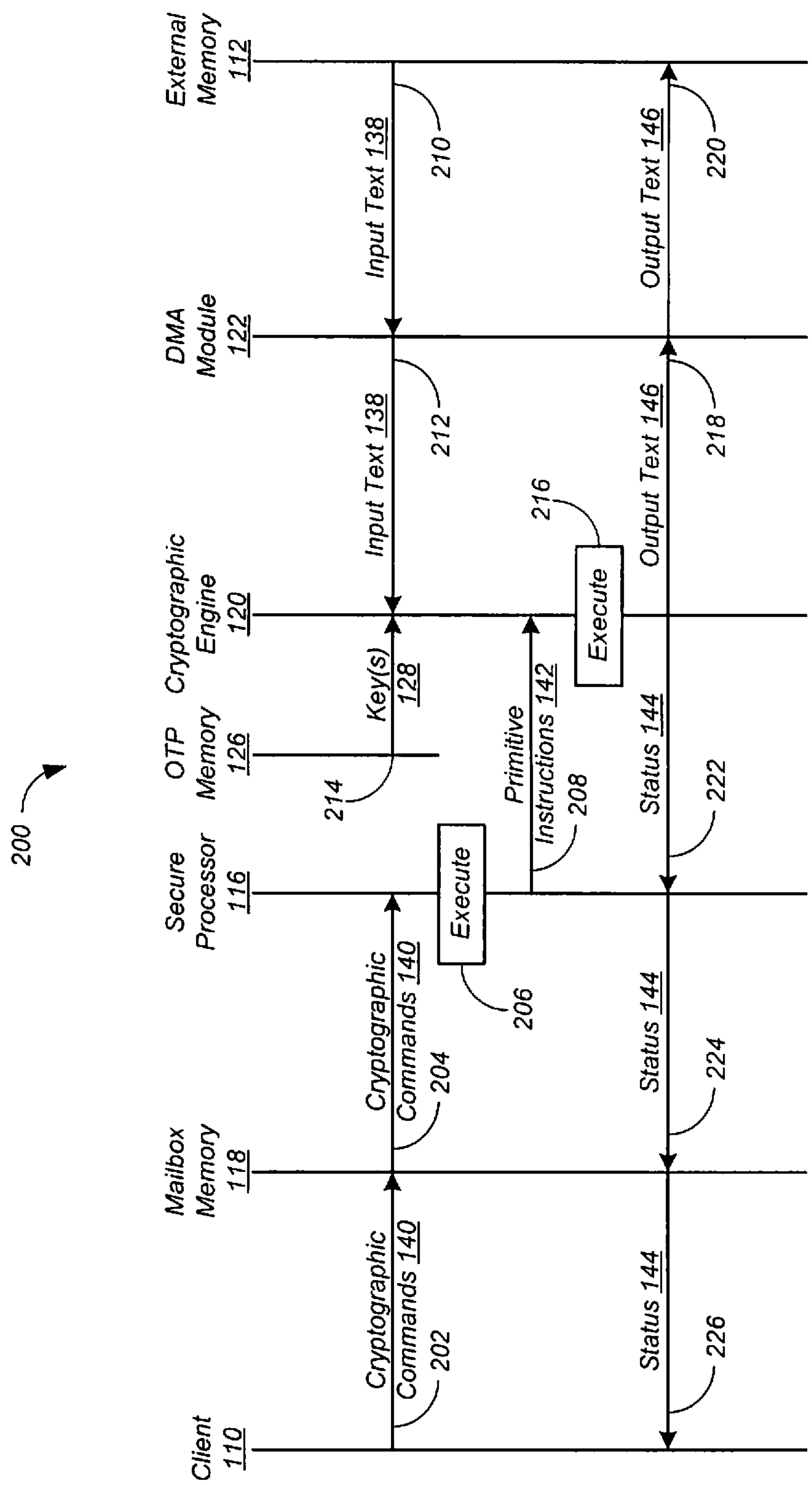
FIG. 2 shows a process for the cryptographic system of FIG. 1 according to one embodiment.

FIG. 2 shows a process 200 for cryptographic system 100 of FIG. 1 according to one embodiment. Although in the described embodiments the elements of process 200 are presented in one arrangement, other embodiments may feature other arrangements. For example, in various embodiments, some or all of the steps of process 200 can be executed in a different order, concurrently, and the like. In some embodiments, process 200 is compliant with the 140 series of Federal Information Processing Standards (FIPS), including at least one of FIPS 140-2 and FIPS 140-3, FIPS operation can be indicated when a configuration bit is set in secure memory, such as OTP memory 126.

Referring to FIG. 2, at 202 client 110 stores one or more cryptographic commands 140 in mailbox memory 118 over client bus 114. At 204, secure processor 116 obtains cryptographic commands 140 from mailbox memory 118 over secure processor bus 130. At 206, secure processor 116 executes cryptographic commands 140. Cryptographic commands 140 include primitive instructions 142. At 208 secure processor 116 sends primitive instructions 142 to cryptographic engine 120.

At 210 and 212, secure processor 116 causes DMA module 122 to transfer input text 138 from external memory 112 to cryptographic engine 120 over secure memory bus 132 and client bus 114. At 214, cryptographic engine 120 obtains one or more cryptographic keys 128 from OTP memory 126. At 216, cryptographic engine 120 executes primitive instructions 142 conditionally in accordance with the contents of trust status register 124 using cryptographic key(s) 128 upon input text 138, thereby producing output text 146. The contents of trust status register 124 reflect the current security configuration, operational status of cryptographic module 108 and other factors. For example, in FIPS-compliant embodiments, the security configuration bits can indicate the current FIPS mode. The operational status bits can indicate power states, initialization states, operational states, error states, sleep states, and the like. Trust status register 124 also includes programmable reserved bits.

After executing cryptographic commands 140, cryptographic module 108 provides output text 146 and status 144. In particular, At 218 and 220, secure processor 116 causes DMA module 122 to transfer output text 146 from cryptographic engine 120 to external memory 112 over secure memory bus 132 and client bus 114. At 222 cryptographic engine 120 provides status 144 to secure processor 116. At 224 secure processor 116 stores status 144 in mailbox memory 118 over secure processor bus 130. At 226, client 110 obtains status 144 from mailbox memory 118 over client bus 114.

Figure 3:
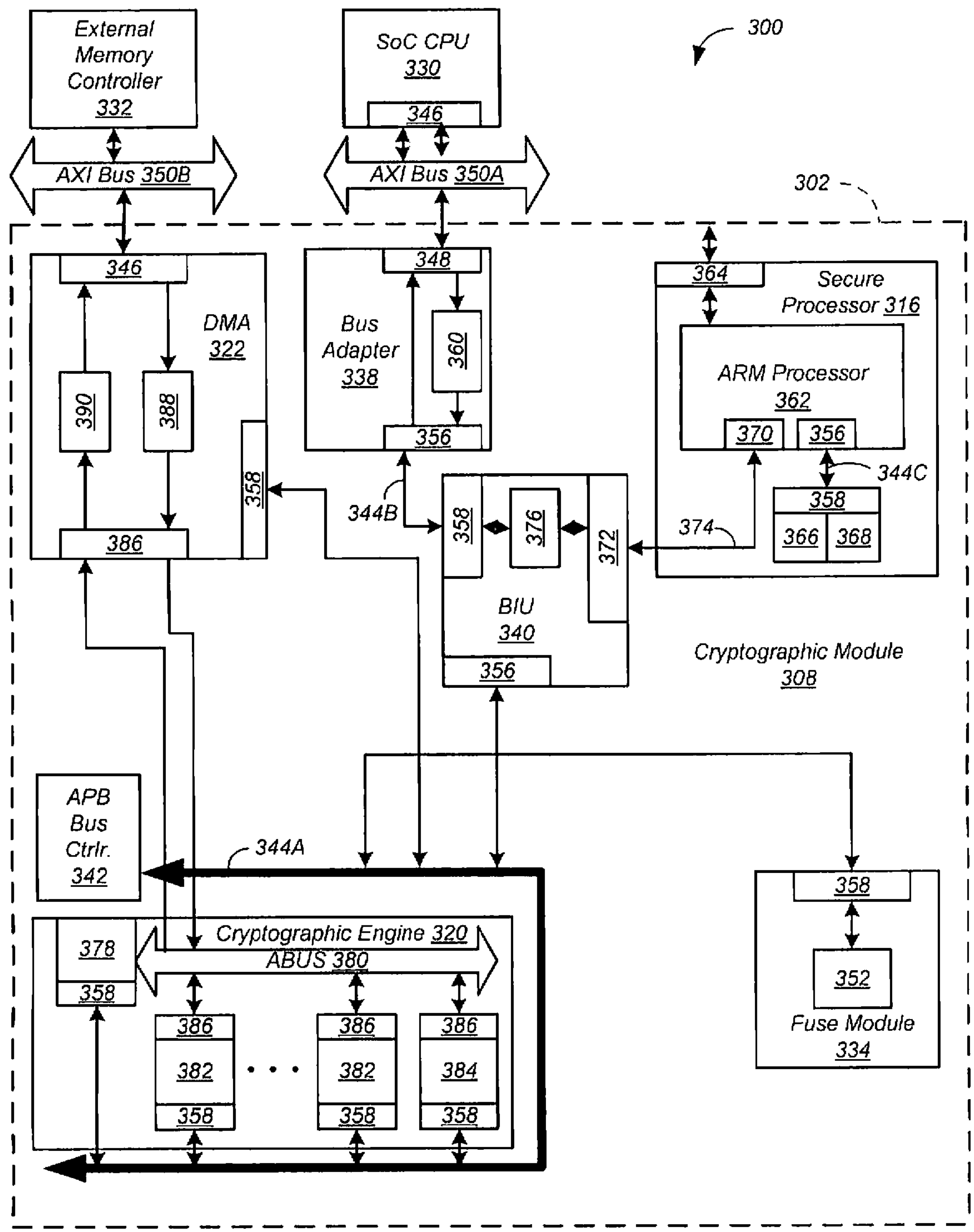
FIG. 3 shows an implementation according to one embodiment.

FIG. 3 shows an implementation 300 according to one embodiment. Although in the described embodiments the elements of implementation 300 are presented in one arrangement, other embodiments may feature other arrangements. For example, elements of implementation 300 can be implemented in hardware, software, or combinations thereof. In some embodiments, implementation 300 is compliant with the 140 series of Federal Information Processing Standards (FIPS), including at least one of FIPS 140-2 and FIPS 140-3.

Referring to FIG. 3, implementation 300 includes a cryptographic module 308 in communication with a SoC CPU 330, an external memory controller 332, and a fuse module 334. Cryptographic module 308 includes a DMA controller 322, a cryptographic engine 320, a secure processor 316, a bus adapter 338, a bus interface unit (BIU) 340, and an Advanced Peripheral Bus (APB) bus controller 342 to control an APB bus 344A. SoC CPU 330 and bus adapter 338 include an Advanced eXtensible Interface (AXI) master 346 and an AXI slave 348, respectively, for communication over an AXI bus 350A. DMA controller 322 includes an AXI master 346 for communication over an AXI bus 350B. In some embodiments, cryptographic module 108 is configured to include an Advanced High-performance Bus (AHB) interface in place of the AXI interface. This configuration allows easy interface to SoCs having an AHB system bus. Fuse module 334 includes an OTP fuse bank 352 and an APB slave 358 for communication over APB bus 344A. Cryptographic module 308 also includes Bus adapter 338 and BIU 340 include an APB master 356 and an APB slave 358, respectively, for communication over an APB bus 344B. Bus adapter 338 also includes an input FIFO 360.

Secure processor 316 includes an ARM processor 362, a secure JTAG controller 364, a boot ROM 366, and a RAM 368 for code and data. Secure processor 316 includes an AHB master 356 for communication with ROM 366 and RAM 368 over an AHB bus 344C and an AHB slave 358. Secure processor 316 also includes an AHB master 370 for communication with BIU 340 over an AHB bus 374. Secure JTAG controller 364 manages the JTAG access mode to cryptographic module 308 for supporting a comprehensive test infrastructure that permits silicon circuit testing, and software debugging, at the device development phase. To support troubleshooting for a failed device during the device deployment phase, secure JTAG controller 364 employs a challenge/response Public Key Infrastructure (PKI) based secure protocol for eliminating the device key residing in OTP fuse bank 352 of cryptographic module 308, and granting the JTAG access to the test/debugger equipment.

BIU 340 includes an AHB slave 372 for communication over AHB bus 374, and an APB master 356 for communication over APB bus 344A. BIU 340 also includes a mailbox FIFO 376 to isolate secure processor 316. The security boundary is shown as a dashed line at 302.

Cryptographic engine 320 includes a plurality of cryptographic accelerators 382, a scratch-pad memory 384, and an ABUS controller 378 to control an internal ABUS 380. Each of cryptographic accelerators 382 and scratch-pad memory 384 has a respective ABUS interface 386 for communication with ABUS 380. Each of ABUS controller 378, cryptographic accelerators 382, and scratch-pad memory 384 has a respective APB slave 358 for communication with APB bus 344A. ABUS 380 is a flexible bus structure allowing different cryptographic accelerators 382 and DMA controller 322 to be connected in different combinations. This allows for creation of composite cryptographic algorithms. One example is an AES-HASH composite algorithm. Additional engines can be added to ABUS 380 to support data rights management engines. One example is adding controller chips for set-top box applications. Additional engines may include one or a multitude of integrity check engines that support message authentication functionality. Cryptographic module 108 can also be configured to control engines outside of security boundary 302, such as the loading of keys into those engines, thereby acting as a gate to control authorized access and usage of those engines.

DMA controller 322 includes an ABUS interface 386 for communication with ABUS 380, an AXI master 346 for communication with external memory controller 332 over AXI bus 350B, and an APB slave 358 for communication with APB bus 344A. DMA controller 322 also includes an input FIFO 388 and an output FIFO 390.

Various embodiments also provide the ability to load and execute signed memory overlays from an external source. These overlays can be used for testing and customizing operations for a given application. For example, these overlays can be used to patch defects in mask-programmed ROMs, add custom primitives for simulation and test, and providing complete solutions in self-contained, digitally-signed packages.

For example, various embodiments can include a mask-programmed ROM, programmed with a certain set of firmware. This firmware builds in SRAM a table, consisting of a set of pointers to functions contained in ROM. These functions form the basis for primitives and various, layered support services for these primitives. Such embodiments are capable of RSA cryptography. An overlay, conforming to a set of guidelines, may be compiled, linked and digitally signed with a private key. Using a primitive, this overlay may be loaded and authenticated with the public key corresponding to the private key. If this overlay authenticates with the given credentials, control within cryptographic module 108 is shifted to the overlay. This overlay, with the knowledge of where the table of pointers is located in SRAM, may augment, replace, enhance, or modify the existing mask-programmed firmware contained in the cryptographic module 108, by simply replacing these pointers, with ones pointing to replacement functions contained in the overlay itself. This ROM/overlay combination may be unique to a specific application.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A cryptographic apparatus module comprising:

a memory module configured to (i) receive cryptographic commands received from a client device via a first bus, and (ii) store the cryptographic commands, wherein the client device is external to the cryptographic apparatus module;

a processor configured to access the cryptographic commands from the memory module via a second bus, execute the cryptographic commands, and access the memory module via the second bus to store a status of execution of the cryptographic commands in the memory module, wherein the memory module is configured to, via the first bus, transfer the status of execution of the cryptographic commands stored in the memory module to the client device, and wherein the memory module is configured to isolate the processor from the client device to prevent the client device from accessing the processor; and a cryptographic device configured to receive a cryptographic key from a first memory, wherein the first memory is in the cryptographic module;

receive first text from a second memory, wherein the second memory is external to the cryptographic module, and wherein the first text comprises plaintext and ciphertext;

transfer second text to the second memory, wherein the second text comprises plaintext and ciphertext; and in accordance with the cryptographic commands and the cryptographic key, (i) encrypt the plaintext of the first text to provide the ciphertext of the second text, and (ii) decrypt the ciphertext of the second text to provide the plaintext of the second text.

2. The cryptographic module of claim 1, further comprising the first memory, wherein the first memory is a one-time-programmable memory and is configured to store the cryptographic key.

3. The cryptographic module of claim 2, further comprising a direct memory access module configured to:

receive the first text from and transfer the second text to the second memory via the first bus; and receive the second text from and transfer the first text to the cryptographic device via a third bus.

4. The cryptographic module of claim 3, further comprising a trust status register, wherein:

the cryptographic commands include primitive instructions; and the cryptographic device executes the primitive instructions in accordance with contents of the trust status register.

5. An integrated circuit comprising:

the cryptographic module of claim 4;

the client device;

the first memory; and the second memory.

6. A storage drive comprising:

the integrated circuit of claim 5; and a magnetic storage medium configured to transfer the first text to and receive the second text from the second memory.

7. The cryptographic module of claim 1, wherein:

the second bus is connected between the memory module and the processor; and the memory module is connected between the client device and the second bus.

8. The cryptographic module of claim 1, wherein:

the cryptographic module is implemented on a first system-on-chip; and the client device is implemented on a second system-on-chip.

9. A system comprising:

the cryptographic module of claim 1;

the client device, wherein the client device is a second processor and accesses the cryptographic module via the first bus; and a memory controller in communication with the cryptographic module via a third bus.

10. The system of claim 9, wherein the cryptographic module comprises a direct memory access module configured to:

via the third bus, receive first text from and transfer second text to the memory controller; and via a fourth bus, receive the second text from and transfer the first text to the cryptographic device.

11. The system of claim 10, wherein:

the third bus is an advanced extensible interface bus; and the fourth bus is an advanced high-performance bus.

12. The system of claim 10, wherein:

the cryptographic module comprises a fuse module connected to the fourth bus and includes a fuse bank; and the fuse bank stores a key.

13. The system of claim 12, wherein:

the processor comprises a second controller;

the second controller supports troubleshooting including employing a secure protocol based on a public key infrastructure; and the controller removes the key from the fuse bank based on the secure protocol.

14. The system of claim 10, wherein:

the cryptographic module comprise a interface device;

the interface device is connected (i) between the processor and the first bus, and (ii) between the processor and the third bus; and the interface device comprise a first-in-first-out memory; and the first-in-first-out memory stores data transferred (i) between the first bus and the interface device, (ii) between the fourth bus and the interface device, and (iii) between the processor and the interface device.

15. The cryptographic module of claim 1, wherein:

the processor comprises the first memory; and the second memory is isolated from the client device to prevent the client device from accessing the second memory.

16. The cryptographic module of claim 1, wherein:

the cryptographic device comprises a third memory; and the third memory is isolated from the client device to prevent the client device from accessing the third memory.

17. A method comprising:

storing cryptographic commands transferred from a client device to a cryptographic module via a first bus in a memory module, wherein the client device is external to the cryptographic module;

accessing the cryptographic commands via a processor from a the memory module using the second bus;

executing the cryptographic commands;

accessing the memory module via the second bus to store a status of execution of the cryptographic commands in the memory module;

via the first bus, transferring the status of execution of the cryptographic commands from the memory module to the client device;

isolating the processor from the client device via the memory module to prevent the client device from accessing the processor;

receiving a cryptographic key from a first memory at a cryptographic device, wherein the first memory is in the cryptographic module;

receiving first text from a second memory at the cryptographic device, wherein the second memory is external to the cryptographic module, and wherein the first text comprises plaintext and ciphertext;

transferring second text to the second memory from the cryptographic device, wherein the second text comprises plaintext and ciphertext; and in accordance with the cryptographic commands and the cryptographic key, (i) encrypting the plaintext of the first text via the cryptographic device to provide the ciphertext of the second text, and (ii) decrypting the ciphertext of the second text via the cryptographic device to provide the plaintext of the second text.

18. The method of claim 17, further comprising storing the cryptographic key in the first memory, wherein the first memory is a one-time-programmable memory.

19. The method of claim 18, further comprising:

receiving the first text from and transferring the second text to the second memory via the first bus; and receiving the second text from and transferring the first text to the cryptographic device via a third bus.

20. The method of claim 19, further comprising executing primitive instructions in accordance with contents of a trust status register, wherein the cryptographic commands include the primitive instructions.

* * * * *